United States Patent [19]
Hattori et al.

[11] 4,158,499
[45] Jun. 19, 1979

[54] BUFFER DEVICE FOR THE SCANNING MECHANISM OF AN ELECTROSTATIC COPIER

[75] Inventors: Hiroyuki Hattori, Inagi; Hiroshi Ogawa, Kawasaki; Hirotoshi Kishi, Tokyo; Kazumi Umezawa; Seiji Sagara, both of Kawasaki, all of Japan

[73] Assignee: Canon Kabushiki Kaisha, Tokyo, Japan

[21] Appl. No.: 886,414

[22] Filed: Mar. 14, 1978

[30] Foreign Application Priority Data

Mar. 24, 1977 [JP] Japan ................................. 52-32576

[51] Int. Cl.² .................... G03G 15/28; G03G 15/32
[52] U.S. Cl. ........................................... 355/8; 355/11
[58] Field of Search ..................... 355/3 R, 8, 11, 14, 355/133

[56] References Cited

U.S. PATENT DOCUMENTS

| | | | |
|---|---|---|---|
| 3,697,165 | 10/1972 | Morriston et al. | 355/8 |
| 3,914,044 | 10/1975 | Ogawa | 355/8 |
| 3,918,806 | 11/1975 | Cook | 355/8 |

*Primary Examiner*—Fred L. Braun
*Attorney, Agent, or Firm*—Fitzpatrick, Cella, Harper & Scinto

[57] ABSTRACT

A buffer device for use in an image forming apparatus wherein a reciprocable member is placed for reciprocating motion through a belt by a rotary member driven by a drive source, the buffer device has at least two displaceable shock-absorbing rotary elements positioned so as not to interfere with the reciprocating motion of the reciprocating member and provided so as to engage with mutually facing portions of the belt, and a braking element for suppressing by friction the displacement of the shock-absorbing rotary elements, the shock given to the reciprocating member by the forward and reverse rotations of the rotary member being absorbed by displacement of the shock-absorbing rotary elements.

6 Claims, 9 Drawing Figures

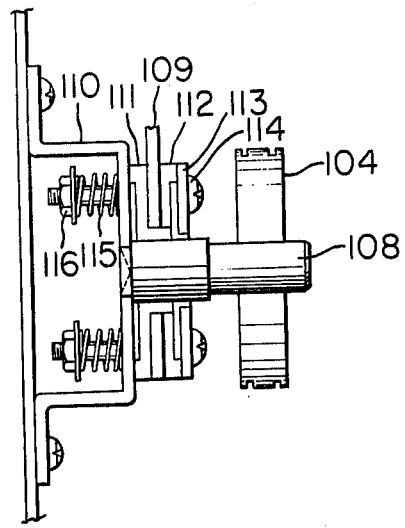
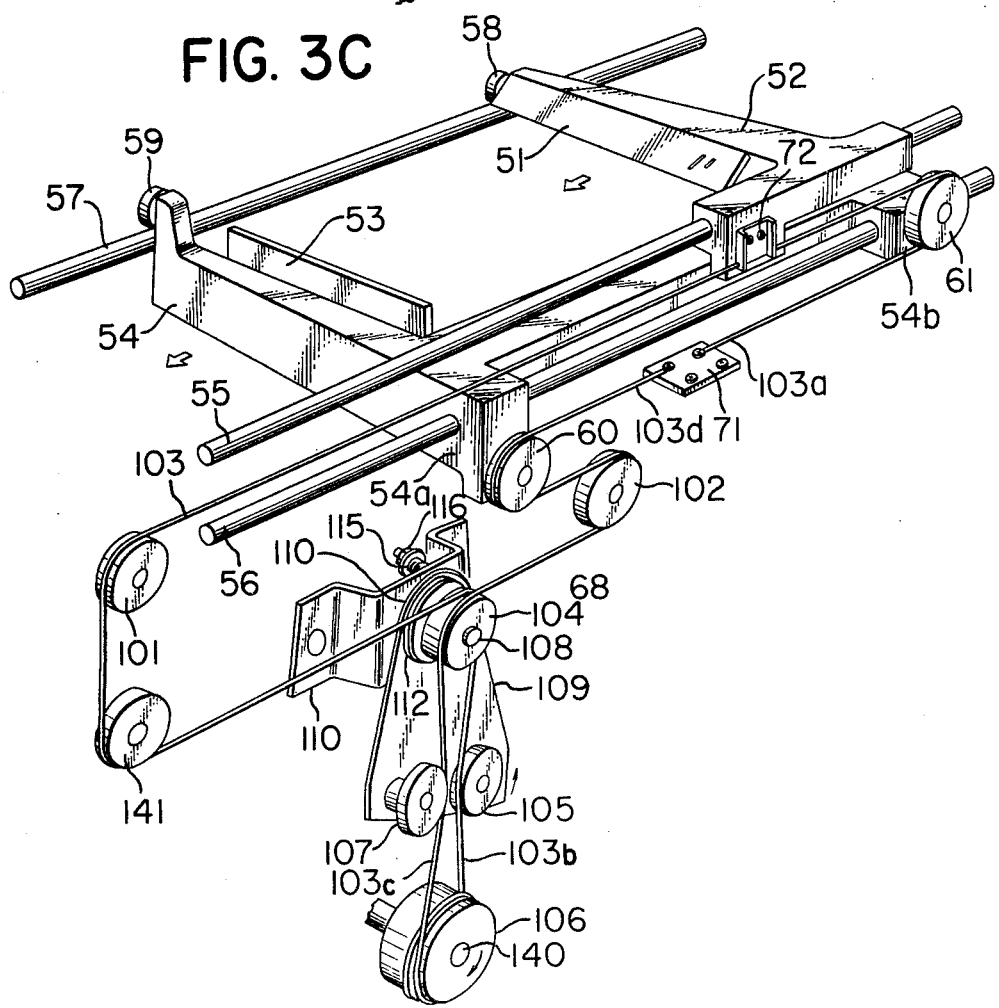

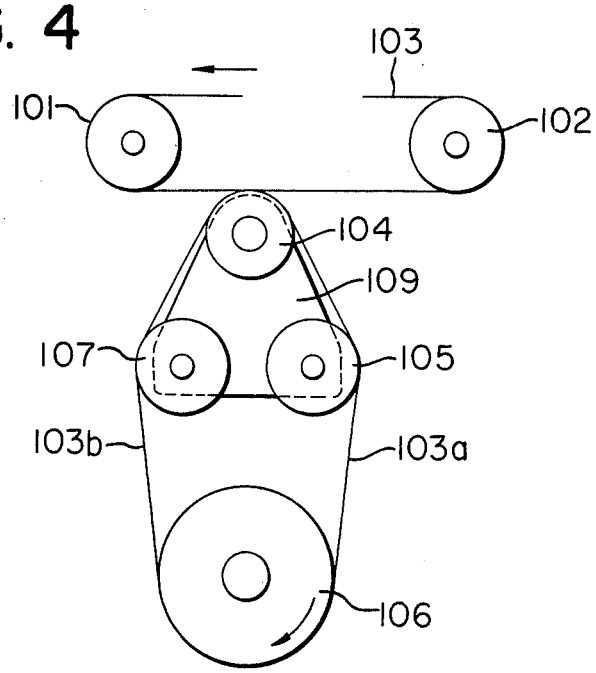
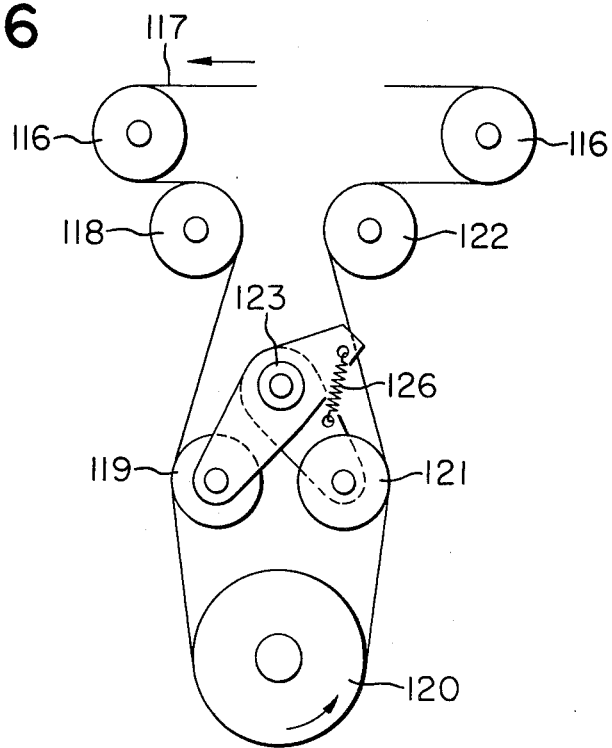

BUFFER DEVICE FOR THE SCANNING MECHANISM OF AN ELECTROSTATIC COPIER

BACKGROUND OF THE INVENTION

1. Field of the Invention

The present invention relates to a buffer device adapted for use in an image forming apparatus and allowing displacement of a reciprocating member with a rapid start and a constant speed, and more particularly to a buffer device for use in an apparatus for causing reciprocating motion in a reciprocating member such as an original table or an optical system by means of a rotary torque from a motor or a clutch connected thereto through a belt or wire etc.

2. Description of the Prior Art

FIG. 1 shows a copying apparatus with a reciprocating optical system utilizing a buffer device. At the start of exposure step, an illuminating lamp 4 and a first mirror 5 constituting the movable part of the optical system are driven toward the right, in the illustration, at a speed identical with the peripheral speed of a photosensitive drum 3, and simultaneously a second mirror is displaced also to the right at a speed half of the above-mentioned speed.

The exposing optical system in a copier requires a mechanism for driving said first and second mirrors with an exact speed ratio of 2:1, and a buffer device is employed in driving such an optical system. An example of a mirror drive mechanism utilizing a conventional buffer device is shown in FIG. 2 wherein there is provided, between a stationary pulley 63 and a drive pulley 65, a tension pulley 68 rotatably mounted on a pulley mounting plate 67 swingable around an axis 66, said plate being biased toward the drive pulley 65 by means of a spring 69.

In the illustration the exposure of the original is performed in the direction indicated by the arrow. At the moment when the exposure step is completed and the drive pulley 65 starts to be reversed in a direction opposite to the arrow, the tension side and the slack side of a wire 70, which is used as a belt, are inverted whereby a wire portion 70c is tensioned and causes a counterclockwise of the tension pulley 68 around the axis 66. On the other hand a wire portion 70b becomes slack, and the movement of the drive pulley 65 is not transmitted completely to a first mirror 51 and a second mirror 53 until said slack is absorbed by the spring 69. Such incomplete transmission does not cause, however, a serious problem as imagewise exposure is not performed in the reversing motion in such optical system. On the other hand, at the moment when the drive pulley 65 enters the exposure step, the wire portions 70b and 70c respectively become the tension and slack sides, causing a clockwise swinging of the tension pulley 68 around the axis 66 in order to absorb the slack of said wire portion 70c. In the initial phase of the exposure step the speed of the movable mirror does not coincide with that of the drive pulley because of the facts that the slack absorption by said spring is realized much slower than the slack formation in the wire, and that a vibration is caused in the optical system by the starting shock of the motor or the clutch. The exposure of the original cannot therefore be conducted in said initial phase due to the difference between the mirror speed and the drum peripheral speed. The exposure becomes possible only from a point where the mirror speed becomes identical with the drum peripheral speed, and the portion before reaching said point constitutes an originally unnecessary lead-in portion which will unnecessarily enlarge the dimensions of the apparatus. Also the shocks resulting from switching between the slack state and tensioned state significantly reduces the life of the wire. Furthermore, as the tension of the tension spring is selected smaller than that of the wire, the mirror is apt to be driven, in the reversing motion thereof, with vibration which frequently gives rise to undesirable effects on various parts of the apparatus.

SUMMARY OF THE INVENTION

The object of the present invention is to provide a buffer device allowing a reciprocating member in an image forming apparatus to reach instantly a constant speed driven state.

An another object of the present invention is to provide a buffer device capable of absorbing wire vibration caused by the starting shock of the motor or clutch.

According to the present invention, the above-mentioned objects are achieved by at least two movable shock-absorbing rotary elements provided in positions not affecting the displacement of said reciprocating member and allowing engagement of said rotary elements with mutually facing portions of said wire, whereby the shock to said reciprocating member is absorbed by the displacement of said shock-absorbing rotary elements.

The buffer device of the present invention is therefore capable of allowing the reciprocating member, such as a mirror or an original support table, to reach a constant-speed driven state instantly, and also of reducing the shock resulting from switching of the tension side and slack side of the wire, thus significantly extending the life of the wire.

BRIEF DESCRIPTION OF THE DRAWINGS

FIGS. 3, 3b, 3c, 4, 5a, 5b and 6 are explanatory drawings illustrating the embodiments of the buffer device for wire drive according to the present invention.

DESCRIPTION OF THE PREFERRED EMBODIMENTS

Figure 1:
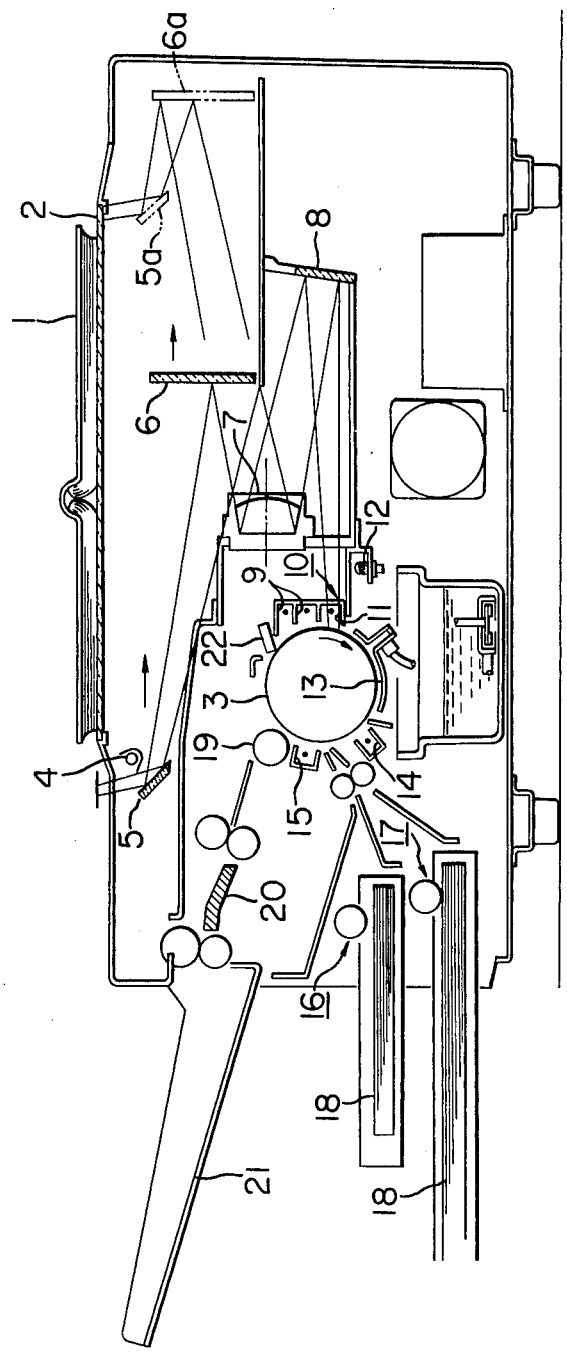
FIG. 1 is a cross-sectional view of an example of a copier wherein the buffer device of the present invention is applicable.
Figure 2:
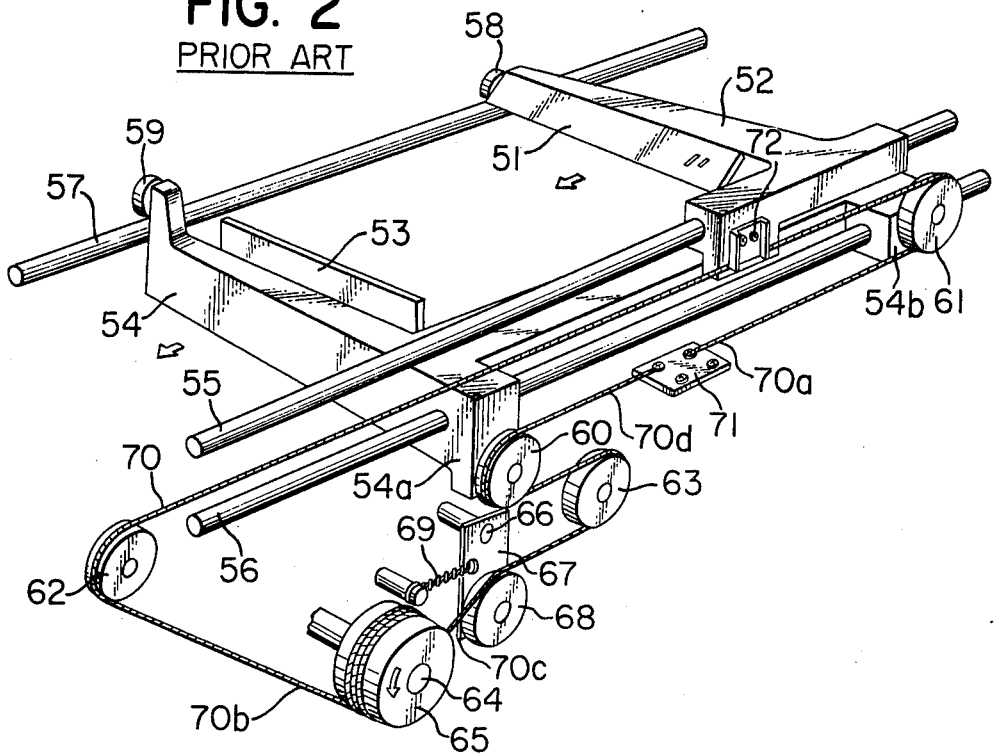
FIG. 2 is a perspective view of a drive mechanism for an optical system employing a conventional buffer device.

The present invention will be further clarified by the embodiments thereof. Now the function of the optical system will be explained in further detail in connection with the function of a copier with reference to FIG. 1. An original 1 to be copied is placed on a glass plate 2 provided on the upper surface of the casing and constituting an original supporting face. Upon actuation of a copy start button, a photosensitive drum 3 starts rotation in the clockwise direction in the illustration. Upon arrival of the photosensitive drum 3 at a determined position, there is released a signal for starting exposure, which initiates the displacement of an illuminating lamp 4 and a first mirror 5 constituting the movable part of the optical system toward the right at a speed identical with the peripheral speed of said photosensitive drum 3, and simultaneously initiates the displacement of a second mirror 6 also toward the right at a speed identical to a half of aforementioned speed. The image on said original 1 is illuminated by said illuminating lamp 4 and is focused, by means of an optical system consisting of said first mirror 5, second mirror 6, an in-mirror lens 7 and a stationary mirror 8, onto a photosensitive layer provided on the surface of said photosensitive drum 3. The exposure is completed upon displacement of said first and second mirrors 5, 6 to the broken-lined positions 5a, 6a, upon detection of which the displacement of the movable parts of the optical system is immediately interrupted and reversed, namely, to the left. The surface of said photosensitive drum 3 is uniformly charged by a primary charger prior to the above-mentioned exposure step, and is subjected to charge elimination by a charge eliminator 11 in the imaging station 10 simultaneously with the above-mentioned exposure. Successively said surface is subjected to a flash exposure by a flash exposure lamp 12 to form an electrostatic latent image on said surface. Said image is liquid-developed in a liquid developing station 13 and successively enters a squeezing charger 14 for squeezing excessive liquid developer. Then the developed image present on the drum is transferred, by means of a transfer charger 15, onto a copy sheet 18 supplied from a paper feed section 16 or 17. After said transfer the copy sheet is separated from the drum in a separating station and is guided into a fixing station 20, and, after fixing, ejected to a tray 21. After transfer, the drum surface is cleaned by means of a contacting blade cleaner 22, thus being prepared for the succeeding imaging cycle.

As apparent from the foregoing explanation, the exposure optical system of a copier requires a mechanism capable of displacing said first and second mirrors with an exact speed ratio of 2:1. Now the buffer device of the present invention will be explained in the following with particular reference to an application in the mechanism for driving an optical system as explained above.

Referring to FIG. 3C showing an optical system drive mechanism employing the buffer device of the present invention, there are provided a first mirror 51 fixedly mounted on a first supporting member 52 with a determined angle to the horizon and a second mirror 53 vertically fixed on a second supporting member 54. On both ends of said first and second mirrors 51, 53 there are provided guide shafts 55, 56 and 57 each parallel to the displacing direction of said first and second mirrors 51, 53. Said first supporting member 52 is slidably fitted at an end thereof on said guide shaft 55 and is provided on the other end thereof with a rotatably mounted roller 58 which is slidably supported on said guide shaft 57. Similarly said second supporting member 54 is supported at an end thereof by arms 54a, 54b thereof slidably fitted on said guide shaft 56 and at the other end thereof by a rotatably mounted roller 59 which is supported on said guide shaft 57. On said arms 54a and 54b of said second supporting member 54 there are rotatably mounted, respectively, a second movable pulley 60 and a first movable pulley 61. To the left, in the illustration, of said guide shafts 55, 56 there is provided a first stationary pulley 101 which is rotatably mounted in a fixed position located to the left of the moving range of said first supporting member 52 and not interfering with said second supporting member 54, and there is further provided a second stationary pulley 102 which is rotatably mounted in a fixed position located to the upper right, in the illustration, of the moving range of said second movable pulley 60. Between and below said first and second stationary pulleys 101, 102 there is provided a drive pulley 106 fixedly mounted on a drive shaft 140 which is supported in a fixed position and rendered rotatable in forward and reverse directions by means of a motor or of a motor-clutch combination.

A drive wire 103 is mounted at an end 103a thereof on a mounting plate 71 which is fixed to the main body, and after passing through said first movable pulley 61, is fixed to said first supporting member 52 by means of a mounting plate 72. Further said wire passes through said first stationary pulley 101, second stationary pulley 141, an idler pulley 104, a tension pulley 105, said drive pulley 106, a tension pulley 107, and the other guide groove of the idler pulley 104, the stationary pulley 102 and second movable pulley 60 and fixed at the other end 103d thereof by means of said mounting plate 71.

Upon rotation of the drive pulley 106 in a direction indicated by the arrow, a portion 103b of the wire 103 is taken up on said pulley 106, and simultaneously a portion 103c of a same length is unwound therefrom. Consequently the first supporting member 52 is displaced in a direction indicated by the arrow at a speed identical with the winding speed of said pulley 106, and similarly the first movable pulley 61 is displaced in the same direction as said first supporting member 52 but at a speed identical to a half of the winding speed of wire. The second supporting member on which said first movable pulley is mounted is therefore displaced in the same direction as the first supporting member 52 but with a speed identical to a half of the displacing speed thereof. The wire portion 103c becoming slack accordingly is absorbed by the displacement of the second movable pulley 60 in the direction of the arrow, whereby the entire wire 103 is maintained in a state of tension. Upon rotation of the drive pulley 106 in the opposite direction, the first and second supporting members 52, 54 are displaced in a direction opposite to the arrow with a speed ratio of 2:1. In this manner said first mirror 51 and second mirror 53 can be displaced in each direction with a speed ratio of 2:1 without altering the total length of the wire 103.

Figure 3A:
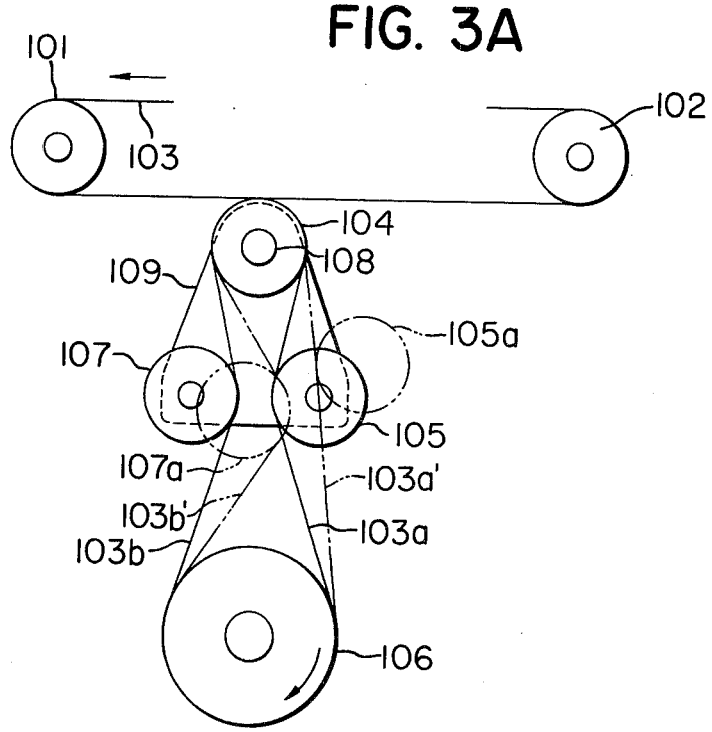

Now there will be given a detailed explanation on the buffer device of the present invention with particular reference to FIGS. 3a, 3b and 3c, wherein there is provided an idler pulley 104 rotatably mounted on a fixed shaft 108, while tension pulleys 105 and 107 are rotatably mounted on fixed shafts provided on a pulley mounting plate 109 which is rendered swingable around said shaft 108. Said shaft 108 is, as shown in FIG. 3b, fixed on a base plate 110 which is in turn fixed for example to the main body. Said pulley mounting plate 109 is sandwiched between brake shoes 111 and 112, on and under which there are respectively provided a pressure plate 113 and a base plate 110, and the plate 109 is mounted to the base plate 110 by screws 114, compression springs 115, and nuts 116 which are provided to pressurize the entire structure. Said screws 114 are located in positions not interfering with said plate 109 upon swinging thereof, said compression springs 115 function to mutually pressurize the brake shoes 111, 112, plate 109, pressure plate 113, and base plate 110, thus exerting a braking effect by the friction between the shaft 108 and the brake shoe 111 to stop the vibration of said plate 109 around the shaft 108. In FIGS. 3a and 3c, the original exposure step is conducted while the wire is advanced in the direction of the arrow. At the moment of entering into said exposure step whereupon the wire portions 103a and 103b respectively become the tension side and slack side, the wire tension causes said plate 109 to swing counterclockwise to displace the tension pulleys 105, 107 respectively to the positions 105a, 107a shown in FIG. 3a. As the result the slack formed in the wire portion 103b is absorbed by the displacement of the pulley 107 to the position 107a, and the vibration of wire generated at the start of exposure is damped and rapidly attenuated by the aforementioned braking effect. Also in the returning step of the mirrors after the exposure step the plate 109 is swung clockwise to cause displacement of tension pulleys in the opposite direction, thus similarly functioning to avoid initial shock in the wire.

The present embodiment, as explained above, is featured by tension pulleys 105, 107 located to be in contact with mutually facing portions of the wire 103, said pulleys functioning to absorb, by the swinging motion thereof, the slack of the wire 103 resulting from the forward and reverse rotations of the drive pulley 106 driven by a motor and to reduce the vibration of the wire by the above-mentioned braking effect. The present embodiment is therefore capable of reducing the shock resulting from the tensioned side of the wire and of rapidly achieving a state wherein the mirror speed coincides with the drive pulley speed.

Furthermore the present embodiment is capable of absorbing shock energy as the swinging pulley mounting plate 109 is sandwiched between brake shoes 111, 112 and pressurized therebetween by means of compression springs.

Furthermore, in the present embodiment, said braking effect can be easily regulated, by altering the elasticity of said compression springs or by regulating the friction of brake shoes, so as to absorb the initial shock in the wire and to suppress the wire elongation.

FIG. 4 shows an another embodiment of the present invention wherein the tension pulleys, as shown in FIG. 3, are located inside the mutually facing portions of the wire, said pulleys being similarly mounted on a pulley mounting plate 109. Thus, this embodiment is also capable of providing similar advantages as those explained in connection with the embodiment shown in FIG. 3.

Figure 5A:
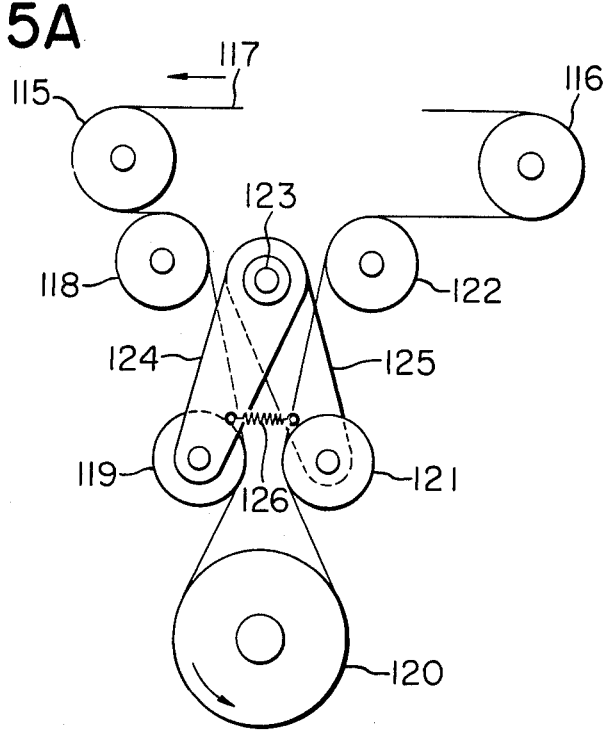
Figure 5B:
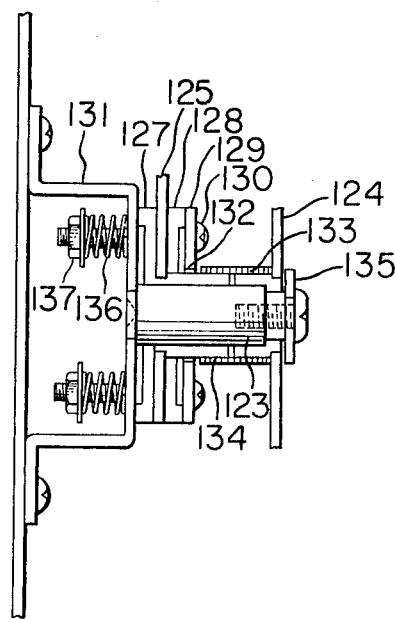

Now there will be explained a further developed embodiment shown in FIGS. 5a and 5b, wherein the stationary pulleys 115, 116 and drive pulley 120 respectively correspond to the stationary pulleys 101, 102 and the drive pulley 106 shown in FIG. 3a. The wire 117 passes through the stationary pulley 115, an idler pulley 118, a tension pulley 119, the drive pulley 120, a tension pulley 121, an idler pulley 122 and the stationary pulley 116, wherein said idler pulleys 118, 122 are rotatably mounted on fixed shafts, while said tension pulleys 119, 121 are rotatably mounted respectively on pulley supporting plates 124, 125 which are respectively swingable around the shaft 123, and which are biased toward each other by means of a spring 126. Further, as shown in FIG. 5b, said plate 125 is sandwiched between brake shoes 127, 128 which are in turn sandwiched between a pressure plate 129 and a base plate 131 to which the entire structure is mounted by means of screws 130, compression springs 136, and nuts 137, whereby there is exerted a braking effect on the swinging motion of the plate 125 around the axis 123 by means of the friction between the base plate 131 and the brake shoe 127. Said plates 125, 124 are respectively fixed to rings 132, 133 to be rendered rotatable around the shaft 123. On the outer periphery of said rings 132, 133 there is provided a unidirectional spring clutch 134. Also there is provided a stopper plate 135 on the shaft 123 in order to avoid the loosening of plate 124 from the shaft.

Said spring clutch 134, exhibiting a function to prevent the mutual widening of the tension pulleys 119 and 121, provides similar advantages as in the foregoing embodiments, and still allows the spring 126 to absorb eventual permanent elongation in the wire 117 as said spring clutch exerts no suppressing effect on the mutual narrowing of said pulleys.

In this embodiment, the tension pulleys 119, 121, being independently mounted on supporting members 124, 125, are capable of independently swinging following the slack of the wire 117, thus respectively moving by a required amount around the shaft 124 to exhibit a larger ability, in comparison with the foregoing embodiments, of preventing the slack and shock in the wire 117.

FIG. 6 shows a still another embodiment which is different from that shown in FIG. 5 in that the tension pulleys are located inside the mutually facing wire portions, and in that the functioning direction of said one-directional clutch is reversed and the spring position is accordingly changed. It will be evident that this embodiment is capable of achieving advantages similar to those obtainable with the embodiment of FIG. 5.

As explained in detail in the foregoing, the wire buffer device of the present invention is highly useful in reducing shocks resulting from changes in the tension state of the wire, in enabling the instantaneous achievement of a constant-speed drive state, and in shortening the length of the lead-in section of the optical system displacement required for example in an image forming apparatus such as a copier.

What we claim is:

1. A buffer device for use in an image forming apparatus wherein a reciprocating member is mounted for being reciprocated by a belt, wherein the belt is driven by a rotary member, said device comprising at least two displaceable shock-absorbing rotary elements positioned so as not to interfere with the reciprocating motion of said reciprocating member, and provided so as to engage with mutually facing portions of said belt, and a braking means for friction-suppressing the displacement of said shock-absorbing rotary elements, wherein shock given to said reciprocating member by the forward and reverse rotation of said rotary member is absorbed by displacement of said shock-absorbing rotary elements.

2. A buffer device according to the claim 1 wherein said shock-absorbing rotary elements engage with said mutually facing belt portions at outer surfaces thereof.

3. A buffer device according to the claim 1 wherein said shock-absorbing rotary elements engage with said mutually facing belt portions at inner surfaces thereof.

4. A buffer device according to claim 1, further comprising two swinging elements, wherein said shock-absorbing rotary elements are mounted respectively on said two swinging elements and further comprising a one-directional clutch mutually connecting said swinging elements for allowing an integral displacement of said swinging elements, in the form of a swinging motion, toward the tension direction of said belt.

5. A buffer device according to the claim 4, further comprising means for applying a tension between said swinging elements.

6. A buffer device according to the claim 4 wherein said braking means includes adjustable means for controlling the swinging motion of said swinging elements.

* * * * *

UNITED STATES PATENT OFFICE
CERTIFICATE OF CORRECTION

Patent No. 4,158,499   Dated June 19, 1979

Inventor(s) HIROYUKI HATTORI, et al.

It is certified that error appears in the above-identified patent and that said Letters Patent are hereby corrected as shown below:

Column 1, line 44, after "clockwise" insert --swinging--;

Column 2, line 17, change "An another" to --Another--;

Column 2, line 44, change "3" to --3a--;

Column 5, line 34, change "an another" to --another--.

Signed and Sealed this

Eleventh Day of September 1979

[SEAL]

Attest:

LUTRELLE F. PARKER
Attesting Officer    Acting Commissioner of Patents and Trademarks